United States Patent [19]

Kosmatka et al.

[11] Patent Number: 4,987,343

[45] Date of Patent: Jan. 22, 1991

[54] VEHICLE HEADLAMP

[75] Inventors: Walter J. Kosmatka, Highland Heights; Frank E. Zalar, Euclid; Dean R. Tener, Bath, all of Ohio

[73] Assignee: General Electric Company, Schenectady, N.Y.

[21] Appl. No.: 252,621

[22] Filed: Oct. 3, 1988

[51] Int. Cl.[5] ............ B60Q 1/04

[52] U.S. Cl. ............ 315/82; 313/113; 313/117; 362/296

[58] Field of Search ............ 313/113, 117; 362/296; 315/82

[56] References Cited

U.S. PATENT DOCUMENTS

| | | |
|---|---|---|
| 2,277,563 | 3/1942 | Scott et al. . |
| 2,366,292 | 1/1945 | Smith . |
| 2,858,467 | 10/1958 | Meese et al. . |
| 2,880,347 | 3/1959 | Flaws, Jr. et al. . |
| 2,987,643 | 6/1961 | Ackerman . |
| 3,136,914 | 6/1964 | Jayne et al. . |
| 4,029,985 | 6/1977 | Rachel ............ 313/115 |
| 4,210,841 | 7/1980 | Vodicka et al. ............ 313/221 |
| 4,280,173 | 7/1981 | Bradley et al. ............ 362/294 |
| 4,380,794 | 4/1983 | Lawson ............ 362/296 |
| 4,754,373 | 6/1988 | Otto et al. ............ 362/296 X |
| 4,799,135 | 1/1989 | Inukai et al. ............ 362/296 |

*Primary Examiner*—Eugene R. LaRoche
*Assistant Examiner*—Do Hyum Yoo
*Attorney, Agent, or Firm*—John P. McMahon; Stanley C. Corwin; Fred Jacob

[57] ABSTRACT

A combined glare and heat shield configuration is disclosed for vehicle headlamp applications. Such composite heat shield member is configured and located inside the headlamp assembly with particular respect to the light source so as to avoid shadowing by this lamp component in the projected light beam pattern. Efficacy of the hermetically sealed electric lamp providing a light source in the present vehicle headlamp construction can be further improved with an infrared reflective coating being deposited on the lamp envelope.

22 Claims, 2 Drawing Sheets

VEHICLE HEADLAMP

RELATED PATENT APPLICATION

A co-pending application Ser. No. 157,436, filed Feb. 18, 1988, and assigned to the same assignee as the present invention, discloses a related headlamp configuration employing a xenon-metal halide lamp as the light source and which provides longlife at high lamp efficiency in automotive forward lighting applications. Since the present invention represents an improvement thereto, said referenced co-pending application is specifically incorporated herein by reference.

BACKGROUND OF THE INVENTION

This invention relates generally to vehicle headlamps utilizing an enclosed curved reflector member in combination with a hermetically sealed light source to provide improved forward illumination and more particularly to providing combined light and heat shield means in such headlamp assembly so as to avoid light reduction in the projected light beam pattern attributable to the shielding means itself.

Federal highway standards regulate the optical performance of vehicle headlamps to a considerable degree. Such regulations further dictate size, shape and placement of headlamps while still permitting both circular and rectangular headlamp configurations to be employed. Maximum glare from the headlamps above the principal or longitudinal lamp axis is specified and with glare proving further objectionable to the vehicle driver in adverse weather conditions where backscatter impedes visibility, e.g. rain, fog and snow. That providing glare reduction in headlamps being used for forward vehicle illumination represents a long recognized and serious consideration can be appreciated from the number of early issued U.S. Pat. Nos. including, 2,277,563; 2,366,292; 2,858,467; 2,880,347; 2,987,643; and 3,136,914 wherein a filament shield has been provided. In these early headlamp configurations, the reflector and lens member were commonly hermetically sealed together so that one or more bare refractory metal filaments could be therein housed to provide the light source and with the filament shield member simply preventing the direct filament light from going directly to the lens.

In a more recently issued U.S. Pat. No. 4,029,985, assigned to the assignee of the present invention, there is disclosed an improved light shield member for the above type headlamp constructions. The disclosed filament shield for a rectangular headlamp blocks the direct filament light from selected portions of the reflector member. Such an objective is achieved with the filament shield comprising a first surface having a cross section which is geometrically similar to the shape of the lens. Attached to the sides of the shield are tabs having shapes geometrically similar to the respective side wall adjacent to each tab and aligned with respect to the lamp filament to prevent direct light from impinging on the side walls. This shield member is located between the filament and the lens member with a front opening being provided so that direct light from the filament light source reaches the lens. In permitting the forward illumination to include direct filament light, there is likelihood for some of this light to be directed to glare zones in the projected light beam pattern. The glare zones are typically areas of the projected light beam above the horizontal in a representative horizontally aimed beam. Light levels in these glare zones are limited to very low levels, typically 75 candles to 350 candles. Direct filament light may add from 200 candles to 400 candles depending upon the light source brightness and wattage and the orientation of the filament. It becomes desirable for glare reduction, therefore, to provide shielding means for the light source which intercepts direct light from reaching the lens member.

The recent emergence of vehicle headlamps either formed with synthetic organic polymer materials or employing an adhesive sealing together of the lens and reflector members formed with glass introduces a still further serious consideration for proper lamp design. As earlier recognized for such plastic type vehicle headlamps in U.S. Pat. Nos. 4,210,841 and 4,280,173, both assigned to the present assignee, a heat shield member is provided in the lamp assembly. In said rectangular type headlamp construction, such heat shield member is typically located between the light source and the top reflector truncating wall. Its purpose is to intercept and diffuse direct infrared radiation and the convected hot radiation so as to avoid failure under lamp operating conditions. Typical lamp operating conditions leading to such failure include automotive alternator voltages in excess of design (e.g. lamp wattage output), static burning (e.g. reduced heat loss through forced convection) and tight enclosures (limiting natural convective heat loss). In the case of such plastic reflector materials, failure may constitute softening, darkening or outgassing. Adhesive sealing polymers typically fail through outgassing or loss of seal integrity. The heat shield member is designed and placed within the headlamp assembly so as to limit the maximum temperature on the reflector wall or adhesive under the expected operating conditions.

A still further commonly assigned U.S. Pat. No. 4,754,373 discloses an improved vehicle headlamp for developing forward illumination and having reduced dimensions relative to the above identified prior art headlamps. This headlamp comprises an enclosed concave parabolic reflector of a rectangular cross section type and having a single tungsten-halogen light source coaxially located within the enclosed reflector. The headlamp has a glare shield arranged around the light source when such headlamp is utilized for low beam application whereas a different heat shield located above the light source is substituted for high beam applications. More particularly, for the low beam application the glare shield substantially prevents the light emitted by the filament which does not encounter any parabolic portions of the reflector from otherwise escaping through the lens in an uncontrolled manner. Such glare shield is a thin metal member which substantially eliminates any direct filament images from being transmitted by the headlamp. On the other hand, for high beam applications such type glare shield is replaced with a heat shield construction of the type disclosed in the aforementioned U.S. Pat. No. 4,210,841 to simply reduce convected heat within the headlamp. As further disclosed in said prior art reference, the particular glare shield configuration therein employed is physically dimensioned so that the rearward portion of the filament light source protrudes therefrom. Such shielding means thereby enables some direct light from the filament source to reach the top and sidewalls of the reflector member which can contribute to glare. On the other hand, since this general headlamp configuration can also be modified in accordance with the present invention, said prior art patent is also specifically incorporated herein by reference.

It remains desirable, therefore, to provide a glare shield means for vehicle headlamp applications providing still better illumination characteristics. In doing so, it becomes important that the projected light beam pattern avoid shadowing by the glare shield means itself. It remains equally desirable to do so in a manner contributing to other improved operational characteristics in the type headlamps being employed. In such latter regard, many new headlamp products are being designed in an adhesive seal format. Use of halogen source lamps for the light source has obviated the need for perfectly hermetic reflector, lens and adhesive materials. Many of these headlamps are also being designed for smaller size. This trend is evident in the automotive industry in such products as the 150 millimeter width headlamp design. As lamp size is reduced, wattage may be increased to make up for the reduced reflector area. The combination of higher wattage and reduced surface area from which heat may be removed, result in higher internal lamp temperatures. It is this higher temperature of lamp operation which dictates material selection for the newer generation of headlamps. Polymeric materials used for lamp reflectors, lens or joining adhesives must withstand the operating temperature for the design life of the lamp. Materials which are capable of performing in hotter environments, tend to be more costly, or even worse, commonly unavailable. In either case the utility of the headlamp product is reduced or obviated.

It is a principal object of the present invention, therefore, to provide a unitary glare and heat shield means for vehicle headlamp applications having a novel physical configuration.

It is another important object of the invention to provide composite glare and heat shield means for a vehicle headlamp exhibiting improved optical performance.

Still another important object of the present invention is to provide vehicle headlamp construction exhibiting improved glare reduction attributable to the light source shielding means therein employed.

A still further important object of the present invention is to combine the glare and heat shield means for a vehicle headlamp in a manner not requiring substantial modification of the overall lamp construction.

These and other objects of the present invention will become more apparent upon consideration of the following description for the present invention.

SUMMARY OF THE INVENTION

In general and in accordance with one aspect of the present invention, novel unitary glare and heat shield means have been discovered with respect to a particular type headlamp construction to provide relatively glare free illumination. Specifically, the presently improved vehicle headlamp construction comprises a reflector member having an internal cavity terminating at one end in a curved reflecting surface, a lens member affixed to the opposite end of the reflector member, a hermetically sealed electric lamp disposed within the internal cavity substantially adjacent to the focal point of the curved reflecting surface, and a unitary glare and heat shield member positioned within the internal cavity adjacent to the electric lamp. The shield member includes a first surface portion located between the lamp light source and the lens member to intercept direct light from reaching the lens member and which further cooperates with a second surface portion located above the lamp light source to avert shadowing by the shield member in the projected light beam pattern while still further serving to reduce convection heating of the reflector member. Such improved headlamp constructions can further employ a reflector member having a circular cross section or reflector member with a rectangular cross section. Likewise, such improved headlamp construction may employ reflector and lens members formed with glass and adhesively bonded together as well as reflector and lens members both formed with synthetic organic polymeric materials which have been joined together by a variety of already known means. In one embodiment the electric lamp employed for the light source can be a halogen containing incandescent lamp whereas a metal halide discharge lamp also provides a suitable light source for a different lamp embodiment. In both of such type lamp embodiments, the light source can be aligned adjacent to the principal headlamp axis to include a coaxial alignment therebetween. Moreover, both illustrated lamp embodiments can further include an infrared reflective coating being provided on a surface of the electric lamp envelope in an already known manner to still further improve the lamp operating efficiency.

In accordance with the present invention, the improved composite glare and heat shield member can be stamped or otherwise formed from a flat metal sheet to provide a box-like enclosure having the planar surface portions above defined. More particularly, such box-like member thereby features a front planar surface section having physical dimensions adequate to intercept all direct light from reaching the lens member and which is suitably provided for a rectangular shaped lens member with a front planar surface having a similar geometric configuration. The box-like member further includes a top planar surface section which cooperates to intercept any remaining direct light from reaching the lens member. Accordingly, the top planar surface section is likewise provided with minimum physical dimensions adequate for such direct light interception and which further requires that none of the light source protrudes significantly beyond the length of said top planar surface. By covering the top of the lamp light source in such manner it can be further appreciated that convection heating of the reflecting member is also reduced. A maximum length for the top planar surface for the shield member is likewise dictated to avoid cutting off direct light from reaching the reflecting surface located at the terminal end of the reflecting member. All such requirements for the top planar surface section for the present shield member can be met in a typical rectangular type headlamp when its geometric configuration is further made similar for the flat top wall of this reflector member. To further illustrate such improvement in a representative rectangular type vehicle headlamp there is provided a reflector member having a generally rectangular cross section, a parabolic central cavity having a concave rear reflective wall and concave reflective side walls together with generally flat top and bottom walls which are substantially parallel to each other. Further provided is a mating light transmissive lens member affixed to the front section of the reflector member and hermetically sealed electric lamp disposed within the central cavity adjacent to the focal point of the reflecting surfaces. The cavity includes a longitudinally extending light source aligned substantially coincident with the principal headlamp axis and a unitary glare and heat shield member positioned within the central cavity to partially envelop the electric lamp in a manner averting both direct light and heat from the lamp light source to reach selected portions of the headlamp. The shield member including a front planar surface section having a rectangular configuration of suitable size which is located between the lamp light source and the lens member to intercept substantially all forward projected direct light from reaching the lens member which lies above the principal lamp axis. A top planar surface section has a rectangular configuration of suitable size to further cooperate in intercepting substantially all remaining direct light from reaching the lens member while still permitting the direct light to reach the side and rear reflective walls of the reflector member. As will be further described in connection with the hereinafter disclosed headlamp embodiments, the present shield member can still further include side tabs or projections of suitable size and configuration to cooperate in intercepting the forward direct light projection.

DETAILED DESCRIPTION OF THE PREFERRED EMBODIMENTS

Figure 1:
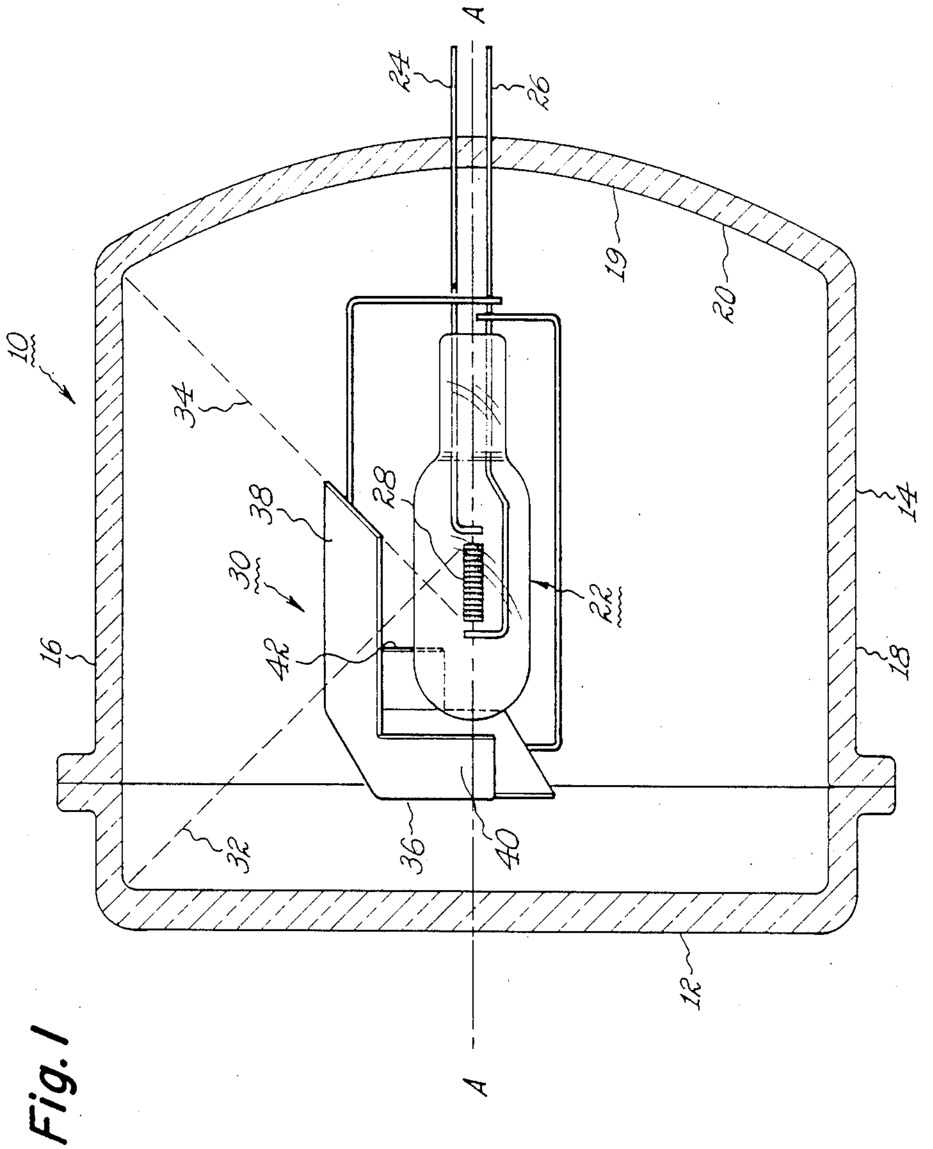
FIG. 1 is a side view depicting one headlamp construction embodying the presently improved composite shield means.

Referring to the drawings, a lamp is depicted in FIG. 1 having the same general construction as disclosed in the aforementioned U.S. Pat. Nos. 4,029,985; 4,210,841; and 4,280,173. Accordingly, the depicted headlamp construction 10 employs lens member 12 sealed to a mating reflector member 14 about the periphery thereof. Reflector 14 is in the shape of a paraboloidal reflector intersected by planes forming top, bottom, left and right side walls, of which only top wall 16 and bottom wall 18 are illustrated in FIG. 1. The inner surface of reflector 14 is provided with a coating 19 of a suitable light-reflecting material such as aluminum or silver. Located in the region of focus of the paraboloidal rear reflecting surface 20 formed by reflector 14 is a hermetically sealed electric lamp 22 which is connected by lead-in conductors 24 and 26 to contacts (not shown) in a manner well known in the art. Lamp 22 is of a conventional single ended tungsten-halogen configuration having the filament coil 28 being aligned substantially coincident with the lamp longitudinal axis A—A. In accordance with the present invention, headlamp 10 is provided with a light and heat intercepting shield 30 to partially envelop the lamp light source 22 in a particular manner. A forwardly projecting direct light ray from the filament coil 28 in said light source is shown by a phantom line 32 in the drawing. Correspondingly, a rearwardly projecting direct light ray from said light source is also depicted with phantom line 34 in the drawing. By reason of its physical location and physical dimensions the depicted shield member 30 is thereby positioned with respect to such light source so as to intercept substantially all forwardly projected light rays while still enabling the rearwardly projected direct light rays not intercepted by a top surface 38 to reach the rear reflective surface 20 of the reflector member. Depicted shield member 30 includes a front planar section 36 of rectangular configuration similar in shape to the geometric shape of the lens member 12. The top planar surface 38 is provided for such shield member which extends longitudinally rearward sufficient to shadow or cover the length of filament coil 28. As can be further noted in the drawing, however, the length of said top planar section does not mask or block a desired rearward projection of direct light rays from reaching the rear reflective wall 20. Side tabs or projections 40 and 42 are also included in the depicted shield member 30 to cooperate optically with the front planar surface 36 and block direct light rays from reaching lens member 12. Said side projections are desirably kept to minimum physical dimensions, however, so as not to block rays from reaching the further reflective walls (not shown) in the herein illustrated lamp embodiment. Convection heating of the reflector member 14 is primarily reduced by the top planar surface 38 of the shield member 30 although some radiant and convection heating of the reflector sidewalls can be reduced with the side projections 40 and 42. Optical perforations in the top planar surface may also prove desirable to diffuse the convected hot gas stream.

Undesirable non-uniform illumination with the projected light beam pattern can be caused by the shield member 30 unless further properly sized with respect to the lamp light source. Such illumination non-uniformity is termed "shadowing" since the projected light beam pattern can include a shadow image of the shield member itself. To substantially avert such non-uniform forward illumination thereby places additional constraints upon the shielding means beyond cosiderations applicable solely to glare reduction. Accordingly, the physical size of the present shield member is limited in certain respects so as not to intercept reflected light rays from the primary or principal paraboloidal reflecting surface 20 in the headlamp to any substantial degree. Such physical limitation can be further illustrated in connection with the depicted headlamp embodiment wherein the relative width of the shield member 30 is maintained so as not to unduly extend into said primary reflecting surface area. While such further optical constraint upon the present shield member seemingly reduces its effectiveness to intercept direct forward light rays from reaching the lens member 12, there is compensation provided in this regard with side tab elements 40 and 42 of the depicted shield member. Hence, the latter features serve as effective extensions of the front planar surface in blocking the direct forward light rays from the filament light source 28 while still enabling the shield member to avert producing an undesirable shadow image in the projected light beam pattern.

It should also be appreciated from the foregoing explanation that the depicted shield member 30 avoids loss of usable light in the projected light beam pattern. This further desirable result is attributable to the optical cooperation taking place between side tab elements (40 and 42) and the front planar surface (36) in order to intercept substantially all related direct forward light from escaping through lens member 12. Such optical cooperation enables sufficient reduction in the front planar surface so as not to unduly intercept the light being reflected from the rear reflecting wall 20 and which would otherwise emerge from the lens member. Since the projected light beam pattern is principally formed with the reflected light being obtained from this reflector region, such light loss can be expected to reduce the provided illumination. Consequently, an incorporation of side projections in the present shield member reduces the frontal shield area requirements while also minimizing usable light loss in the headlamp construction.

Figure 2:
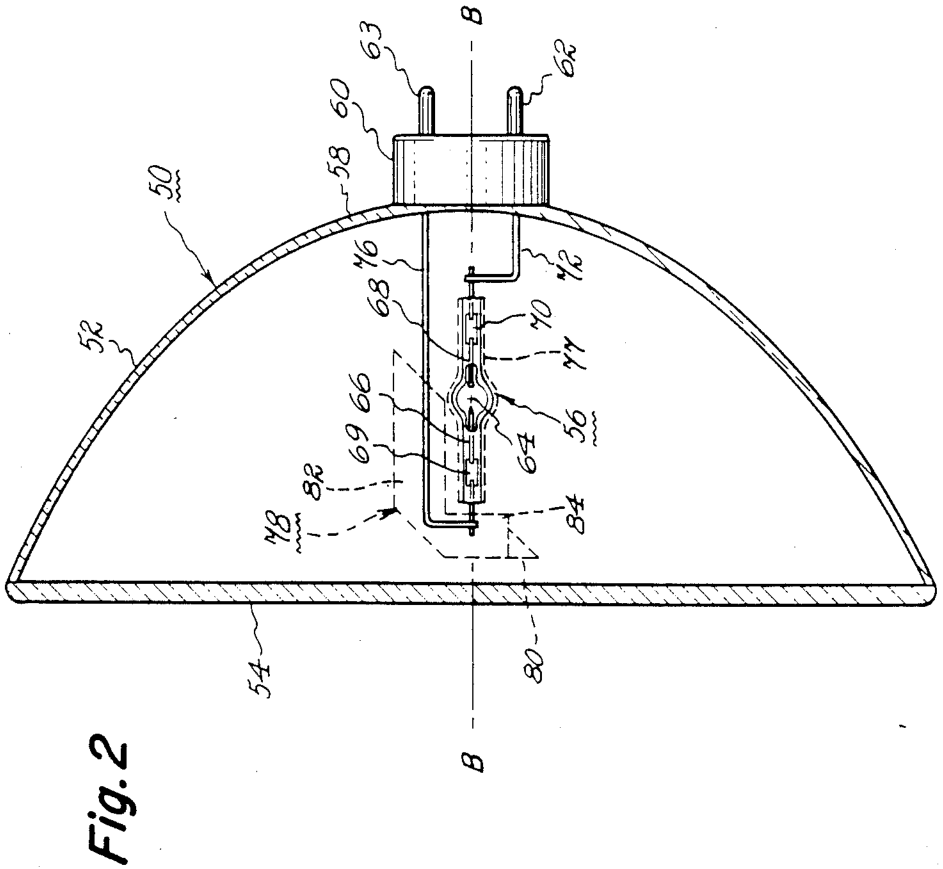
FIG. 2 is a top view for a different headlamp construction employing such improved light source means.

In FIG. 2 there is depicted a headlamp construction having the same general configuration as disclosed in the above mentioned co-pending application Ser. No. 157,436 and which further includes the improved composite glare and heat shield means according to the present invention. Said automotive headlamp 50 constructed in accordance with one embodiment of the present invention utilizes a reflector member 52, a mating lens member 54 and an inner xenon-metal halide lamp 56 for its light source. Reflector 52 has a rear concave section 58 having means mounted thereon, such as connector 60 with prongs 62 and 63 capable of being connected to an excitation source on an automotive type vehicle. The reflector 52 has a predetermined focal length 64 occurring along the principal or longitudinal axis B—B of the automotive headlamp 50. A typical reflector member for the illustrated lamp embodiment has a parabolic shape with a focal length in the range of about six millimeters to about thirty-five millimeters with a preferred range from about eight millimeters to about twenty millimeters. The lens member 54 is mated to the front section of the reflector member 52. Lens 54 is a transparent material selected from the group consisting of glass and synthetic organic polymer materials. The transparent lens member has a face preferably formed of prism elements. The inner lamp light source 56 is predeterminately within the reflector so as to be approximately disposed near the focal length 64 of the reflector. Lamp member 56 is a double-ended type having a pair of electrodes 68 and 66 disposed at opposite ends in the neck sections of the lamp envelope and separated from each other by a predetermined distance is the range of about two millimeters to about four millimeters. Said lamp light source may also be of a single-ended type with both electrodes disposed at the same end of the lamp and separated from each other by the given illustrated range. The pair of electrodes are of a rod-like construction formed of a refractory metal such as tungsten or a tungsten alloy with one to three percent thorium content. In a lamp light source embodiment constructed with quartz material for the lamp envelope, the rod-like electrodes are respectively connected to foil members 70 and 69 sealed in opposite neck portions of the lamp envelope. The foil members 69 and 70 are electrically connected to relatively thick inner leads 72 and 76, which, in turn, are respectively connected to the prong elements 62 and 63. In another embodiment related to a lamp light source constructed with a lamp envelope formed with a refractory type #180 glass available from the General Electric Company, the rod-like tungsten electrodes may be welded to molybdenum in-leads which may be directly sealed in the #180 glass thereby eliminating any need for the foil members 69 and 70. The electrodes 66 and 68 are preferably of the spot-mode type disclosed in U.S. Pat. No. 4,574,219 which is also herein incorporated by reference. Such spot-mode electrodes coated with a cermet material as disclosed in the reference patent develop thermionic emission to supply the needs of a thermionic arc conditions within the lamp envelope 56 in a substantially instantaneous manner. A typical light source of this type features an elongated body having an overall length in the range of about fifteen millimeters to about forty millimeters, neck portions with a diameter in the range of about two millimeters to about five millimeters, and a bulbous shape central portion having a mid-portion with a diameter in the range of about six millimeters to about fifteen millimeters. Such lamp envelope may have a coating 77 preferably deposited on its outer surface which is preferably a multi-layer infrared reflecting film of alternate layers preferably on tantalum oxide and silicon dioxide or titanium oxide and silicon dioxide. The multi-layer infrared reflecting film improves the efficiency of the operating lamp by reflecting infrared energy emitted by the lamp discharge back toward the arc of the lamp so that the arc temperature may be increased and maintained without any further increases to input power from the excitation source. Such infrared reflecting coating 77 is also advantageous in that it incidentally absorbs the ultraviolet energy of the lamp 56 which might otherwise cause degradation to the plastic or other parts of the headlamp 50. The process of absorbing the ultraviolet and reflecting the infrared electromagnetic energy has the additional benefit of increasing the heating rate of the lamp 56 which speeds up or increases the vaporization and ionization of the mercury and metal halide charge found within the lamp and thereby shortens the warm-up time of the xenon-metal halide lamp 56 as it operates with a xenon high pressure. The illustrated lamp construction further includes the glare and heat shield member 78 for the internal lamp light source 56 in accordance with the present invention. As can be seen, the illustrated shield member 78 is depicted in phantom to better point out its relative physical orientation and size with respect to the lamp light source 56. Such type shield member can be attached or otherwise conveniently supported from inner lead 76 so as to partially envelop the lamp light source in the same manner as described in connection with the preceding headlamp embodiment. As further shown in the presently illustrated headlamp construction, the composite shield member 78 is again constructed as a box-like enclosure having a rectangular-shaped front surface 80, a similarly shaped top surface section 82, and a pair of smaller side projections 84. As can be noted in the present drawing, top surface section 82 does not extend rearwardly beyond the light source 56 while the side projections 84 of the shield member still enables related direct light rays to proceed laterally for desired reflection to the lens member 54.

It will be apparent from the foregoing description that a broadly useful shield means has been provided to improve the performance of various vehicle headlamp products. It will be further apparent that significant further modifications can be made in the specific physical features for the headlamp constructions disclosed herein employing such shield means without departing from the spirit and scope of the present invention. For example, multi-filament lamps are contemplated in the headlamp construction utilizing a comparable glare and heat shield member. Additionally, it is contemplated that transverse alignments of the light source with respect to the principal headlamp axis will equally benefit from the composite shielding means herein disclosed. It is likewise contemplated that the present glare and heat shield member can be physically supported within the reflector member by other already known means such as employing a track as disclosed in the aforementioned U.S. Pat. No. 4,280,173. Consequently, it is intended to limit the present invention only by the scope of the appended claims.

What we claim as new and desire to secure by Letters Patent of the United States is:

1. A vehicle headlamp which comprises:

(a) a reflector member having an internal cavity terminating at one end in a curved reflecting surface, said reflector having a principal axis, a focal point and a top section, (b) a lens member affixed to the opposite end of the reflector member, (c) a hermetically sealed electric lamp having a source of light and disposed within the internal cavity substantially adjacent to the focal point of the curved reflecting surface, said lamp having a length which extends longitudinally along and is in adjacent alignment with said principal axis, and (d) a unitary glare and heat shield member positioned within the internal cavity adjacent to the electric lamp, said unitary member comprising;

($d_1$) a first surface portion located between the lamp and lens member, said first surface portion being located in front of the entire lamp and having a length that extends below said lamp so as to intercept forward direct related light emitted from the light source from reaching the lens member;

($d_{11}$) a second surface portion located above said lamp and extending from said first surface portion by a length far enough so as to cover the source of light of said lamp, said second surface portion primarily averting shadowing by the unitary member in the projected beam pattern and intercepting substantially all forward direct related light from reaching said top section of the reflector member;

($d_{111}$) first and second tab portions merged with said first and second surface portions, said tab portions extending from said second surface portion by a length far enough so as to extend below the principal headlamp axis, said tab portions intercepting a portion of the forward direct light which lies above the principal axis, said unitary member functioning during operation of said headlamp so as to (1) cause the first surface portion to intercept forward direct related light from reaching the lens, (2) cause the second surface portion to intercept forward direct related light from reaching the top section that would otherwise result in uncontrolled glare light, (3) cause the first and second tab portions to intercept a portion of the forward direct related light above the principal axis that would otherwise result in uncontrolled glare light, (4) cause the unitary member to avert shadowing of itself in the projected beam pattern, and (5) reduce convection heating of the reflector member.

2. The headlamp of claim 1 wherein the reflector member has a circular cross section.

3. The headlamp of claim 1 wherein the reflector member has a rectangular cross section.

4. The headlamp of claim 1 wherein the electric lamp is an incandescent lamp.

5. The headlamp of claim 1 wherein the electric lamp is a discharge lamp.

6. The headlamp of claim 1 wherein the reflector member and lens member are formed with glass and adhesively bonded together.

7. The headlamp of claim 1 wherein the reflector member and lens member are formed with synthetic organic polymer.

8. The headlamp of claim 1 wherein the electric lamp is provided with an infrared reflective coating.

9. The headlamp of claim 1 wherein the shield member is formed with metal to have a planar construction.

10. The headlamp of claim 1 wherein the shield member includes further surface portions intercepting direct light from the lamp light source.

11. A rectangular type vehicle headlamp which comprises:

(a) a reflector member having a generally rectangular cross section, a parabolic central cavity with at least one internal reflecting surface and generally flat top and bottom sections which are substantially parallel to each other, said reflector having a principal axis and a focal point, (b) a mating light transmissive lens member affixed to the front section of the reflector member, (c) a hermetically sealed electric lamp having a source of light and disposed within the central cavity adjacent to the focal point of the reflecting surface, said lamp having a length which extends longitudinally along and is in adjacent alignment with said principal axis, and (d) a unitary glare and heat shield member positioned within the central cavity adjacent to the electric lamp, said unitary member comprising;

($d_1$) a first surface portion located between the lamp and lens member, said first surface portion being located in front of the entire length lamp and having a length that extends below said lamp so as to intercept forward direct related light emitted from the light source from reaching the lens member;

($d_{11}$) a second surface portion located above said lamp and extending from said first surface portion by a length far enough so as to cover the source of light of said lamp, said second surface portion primarily averting shadowing by the unitary member in the projected beam pattern and intercepting substantially all forward direct related light from reaching said top section of the reflector member;

($d_{111}$) first and second tab portions merged with said first and second surface portions, said tab portions extending from said second surface portion by a length far enough so as to extend below the principal headlamp axis, said tab portions intercepting a portion of the forward direct light which lies above the principal axis, said unitary member functioning during operation of said headlamp so as to (1) cause the first surface portion to intercept forward direct related light from reaching the lens, (2) cause the second surface portion to intercept forward direct related light from reaching the top section that would otherwise result in uncontrolled glare light, (3) cause the first and second tab portions to intercept a portion of the forward direct related light above the principal axis that would otherwise result in uncontrolled glare light, (4) cause the unitary member to avert shadowing of itself in the projected beam pattern, and (5) reduce convection heating of the reflector member.

12. The headlamp of claim 11 wherein both reflector member and lens member are formed with a material selected from the group consisting of glass and a synthetic polymer.

13. The headlamp of claim 11 wherein the electric lamp is an incandescent halogen containing lamp.

14. The headlamp of claim 11 wherein the electric lamp is a metal halide discharge lamp.

15. The headlamp of claim 11 wherein the geometric shape for the first surface of the shield member is similar to the geometric shape of the lens member.

16. The headlamp of claim 15 wherein the goemetric shape for the second surface of the shield member is also similar to the geometric shape of the top section in the reflector member.

17. The headlamp of claim 16 wherein the shield member includes further planar surface portions intercepting direct light from the lamp light source and wherein the geometric shape of all further planar surface portions are similar to remaining sections of the reflector member.

18. The headlamp of claim 11 wherein the electric lamp is provided with an infrared reflective film.

19. A rectangular type vehicle headlamp which comprises:

(a) a reflector member having a generally rectangular cross section, a parabolic central cavity having a concave rear reflective wall together with generally flat top and bottom walls which are substantially parallel to each other, said reflector having a principal axis and a focal point, (b) a mating light transmissive lens member affixed to the front section of the reflector member, (c) a hermetically sealed electric lamp disposed within the central cavity adjacent to the focal point of the reflecting surfaces which includes a longitudinally extending light source having a length which is aligned substantially coincident with the principal headlamp axis, and (d) a unitary glare and heat shield member positioned within the central cavity to partially envelop the electric lamp said unitary member comprising;

($d_I$) a first surface portion located between the lamp and lens member, said first surface portion being located in front of the entire lamp and having a length that extends below said lamp so as to intercept forward direct related light emitted from the light source from reaching the lens member;

($d_{II}$) a second surface portion located above said lamp and extending from said first surface portion by a length far enough so as to cover the source of light of said lamp, said second surface portion primarily averting shadowing by the unitary member in the projected beam pattern and intercepting substantially all forward direct related light from reaching said top section of the reflector member;

($d_{III}$) first and second tab portions merged with said first and second surface portions, said tab portions extending from said second surface portion by a length far enough so as to extend below the principal headlamp axis, said tab portions intercepting a portion of the forward direct light which lies above the principal axis, said unitary member functioning during operation of said headlamp so as to (1) cause the first surface portion to intercept forward direct related light from reaching the lens, (2) cause the second surface portion to intercept forward direct related light from reaching the top section that would otherwise result in uncontrolled glare light, (3) cause the first and second tab portions to intercept a portion of the forward direct related light above the principal axis that would otherwise result in uncontrolled glare light, (4) cause the unitary member to avert shadowing of itself in the projected beam pattern, and (5) reduce convection heating of the reflector member.

20. The headlamp of claim 19 wherein the electric lamp is an incandescent halogen containing lamp.

21. The headlamp of claim 19 wherein the electric lamp is a metal halide discharge lamp.

22. The headlamp of claim 19 wherein the electric lamp is provided with an infrared reflective film.

* * * * *